United States Patent [19]

Hallerback

[11] Patent Number: 4,677,725
[45] Date of Patent: * Jul. 7, 1987

[54] MOUNTING TOOL

[75] Inventor: Stig L. Hallerback, Vastra Frolunda, Sweden

[73] Assignee: Aktiebolaget SKF, Goteborg, Sweden

[*] Notice: The portion of the term of this patent subsequent to May 13, 2003 has been disclaimed.

[21] Appl. No.: 812,445

[22] Filed: Dec. 23, 1985

Related U.S. Application Data

[63] Continuation-in-part of Ser. No. 574,745, Jan. 30, 1984, Pat. No. 4,587,715.

[30] Foreign Application Priority Data

Mar. 7, 1983 [SE] Sweden .................................. 8301218

[51] Int. Cl.$^4$ ............................................. B25B 27/02
[52] U.S. Cl. ......................................... 29/280; 29/283
[58] Field of Search ................. 29/234, 255, 263, 280, 29/282, 525; 403/362; 33/163, 164 R

[56] References Cited

U.S. PATENT DOCUMENTS

| 1,412,469 | 4/1922 | Jimerson | 403/362 X |
|---|---|---|---|
| 3,030,702 | 4/1962 | Fowler | 29/280 |
| 3,724,865 | 4/1973 | Cristie | 403/362 X |
| 3,907,334 | 9/1975 | Schera. Jr. | 403/362 X |
| 4,252,458 | 2/1981 | Keens | 403/362 X |
| 4,259,774 | 4/1981 | Dolinski et al. | 29/263 |
| 4,587,715 | 5/1986 | Hallerbäck | 29/525 |

Primary Examiner—Frederick R. Schmidt
Assistant Examiner—Steven P. Schad
Attorney, Agent, or Firm—Eugene E. Renz, Jr.

[57] ABSTRACT

A mounting tool for mounting a bearing assembly including an inner ring having a tapered inner peripheral surface and an outer ring and a plurality of rolling elements in the annular space between the rings on a shaft member with a predetermined preload or play by means of a tapered sleeve confronting the tapered surface of the inner ring operable upon axial movement relative to the inner ring to exert a radial seating force on the inner ring of the bearing assembly comprising a mounting member movable axially on the shaft member and engageable with said sleeve member to actuate it axially relative to said inner ring, a spacing ring circumscribing the mounting sleeve and actuatable axially relative thereto and positioned to engage the inner ring when said mounting sleeve is moved axially to actuate the sleeve member and a stop ring having internal threads cooperating with threads on the mounting sleeve to selectively control the position of the spacing ring on the mounting sleeve and thereby control preload in the bearing assembly.

MOUNTING TOOL

This is a continuation-in-part of application Ser. No. 574,745 filed Jan. 30, 1984 for A MOUNTING TOOL now U.S. Pat. No. 4,587,715.

BACKGROUND OF THE INVENTION

The present invention refers to a mounting tool for fitting machine elements, such as rolling bearings, to a shaft or the like.

Machine elements, such as rolling bearings, are generally mounted on a shaft thereby that a member, which often is provided with a tapering bore, is fitted on a tapering sleeve and is driven up on this by means of a nut, which enters on a threaded cylindrical end of the tapering sleeve. At a sufficient tightening of the nut the member then will expand somewhat in radial direction and tensions will arise, which clamp the member to the shaft via the tapering sleeve. The tightened nut is then often arrested in its position by means of a locking washer.

If the machine member is a rolling bearing then it is important that the radial expansion of the inner race ring which is fitted to the shaft via the tapering sleeve can be calculated. It is namely so that a certain play must be at hand in a rolling bearing to allow the bearing to operate satisfactorily. If, therefore, the driving up of the inner race ring on the tapering shaft is too big then the radial expansion thereof will also be too big and the play in the bearing will be too small. In order to calculate this play to some extent, it is used a so-called dynamometric wrench, by means of which the nut is tightened and on which it is possible to read the moment by which the nut has been put under load. This is no certain method and in some cases the play of the bearing must be measured with particular methods.

SUMMARY OF THE INVENTION

By the present invention, it has been provided a mounting tool and a method for mounting machine elements on shafts or the like in which in a simple manner the desired play can be achieved. The invention is characterized thereby that the mounting tool, which is intended to accomplish the fitting of the machine element on a shaft or the like by means of one or more tapering sleeves, incorporates a first driving up sleeve intended to co-operate with the tapering sleeve or one of the tapering sleeves and that an axially adjustable spacing ring is arranged on or in the driving up sleeve.

The spacing ring can be provided with internal threads which co-operate with external threads on the driving up sleeve. It can also be provided with a stop screw for arresting the same.

A separate stop ring with internal threads can according to the invention be arranged on the driving up sleeve for restriction of the axial movement of the spacing ring.

The invention also incorporates a method for mounting a machine element, such as rolling bearing on a shaft with use of the mounting tool according to the invention and this method is characterized thereby that the driving up sleeve of the mounting tool is brought to drive up the tapering sleeve until a radial expansion of the element is just ready to begin, whereupon the spacing ring is pushed back a distance calculated for the expansion of the element whereupon the driving up sleeve is driven further until the spacing ring again contacts the element.

DESCRIPTION OF THE DRAWING

These and other objects of the present invention and the features and details of the operation and construction thereof are hereinafter more fully set forth in the accompanying drawings, wherein.

DESCRIPTION OF THE PREFERRED EMBODIMENT

Figure 1:
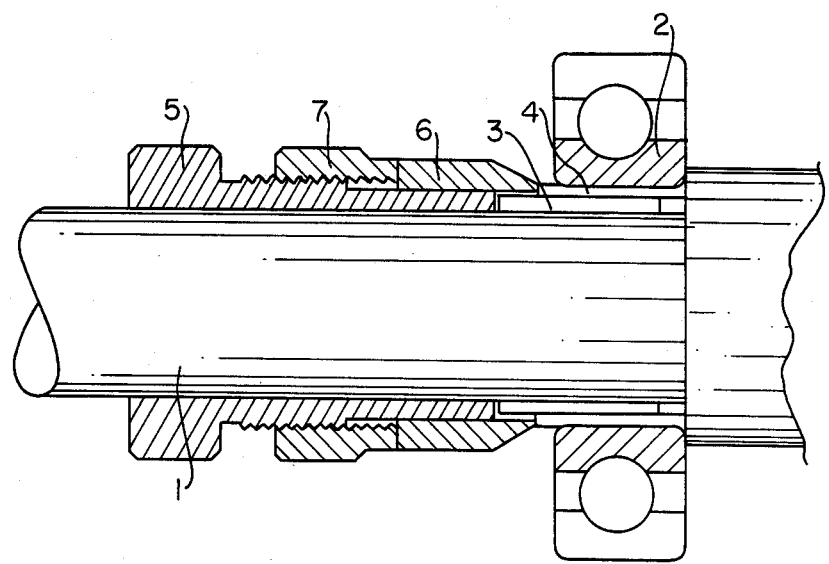
FIG. 1 is a section view of a mounting tool in accordance with the present invention during mounting of a ball bearing on a shaft.

The drawing shows a shaft 1 on which is fitted a ball bearing 2, which shall be connected by means of two oppositely tapered sleeves 3 and 4. These sleeves can be made from plastic material and they are further described in Swedish patent specification No. 412,792. On the shaft 1 is arranged a mounting sleeve 5 according to the invention. On this mounting sleeve 5 there is in turn arranged a spacing ring 6 and stop ring 7.

When the bearing 2 shall be mounted, this arranged upon the sleeves 3 and 4 and the mounting sleeve 5 is pushed in against the tapering sleeve 3 with manual force just so hard as possible without the inner race ring beginning to expand radially. The spacing ring 6 is thereupon brought against the end of the tapering sleeve 4 by means of the stop ring 7. This stop ring 7 is then unscrewed a certain distance and the mounting sleeve 5 is thereupon made to drive up the tapering sleeve 3 until the spacing ring 6 again contacts both the stop ring 7 and the tapering sleeve 4. The inner race ring 2 then has expanded so much as has been calculated by allowing the spacing ring 6 to move a centain distance. It is presupposed that a stop on the side of the bearing which is turned away from the mounting tool will prevent the bearing from moving axially.

The stop ring 7 and the spacing ring 6 can, if so desired, be made in one piece. It is possible to omit the threads and to allow the spacing ring $6'$ to slide freely, but it is then necessary to be able to lock it by means of a stop screw $6_s$ or the like. (see FIG. 2)

Figure 2:
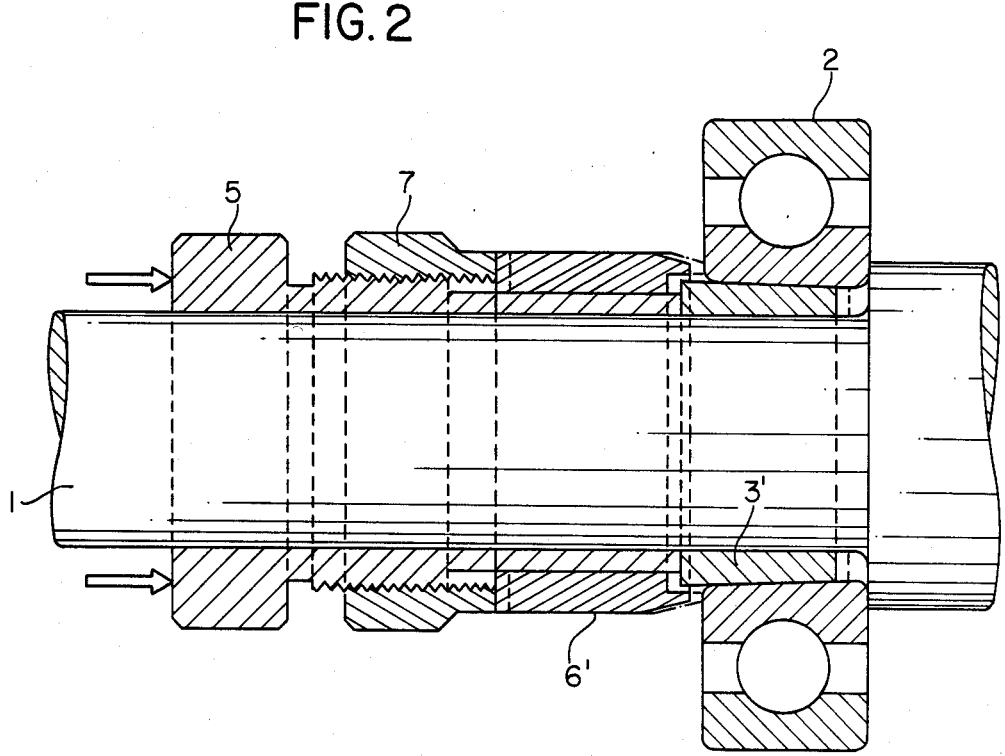
FIG. 2 is a sectional side elevational view similar to FIG. 1 but showing a modification thereof.

FIG. 2 shows a modified mounting tool in accordance with the present invention which is generally similar to that described in FIG. 1, except in the present instance the tool is used in connection with only a single mounting sleeve $3'$ which engages in the bore of the inner ring of the bearing 2, the bore of the inner ring and the mounting sleeve $3'$ having complementary tapered surfaces. The method of using the tool in accordance with this embodiment of the invention is similar to that described above.

When mounting a bearing according to the invention a very accurate expansion of the inner race ring is obtained. At a size according to the scale used on the drawing it is obtained a very accurate expansion of inner race ring with about $5\mu$ if the stop ring 7 is screwed back one thread having a pitch of 5 mm. An almost linear relation between the expansion and the number of threads the stop ring is screwed back is obtained.

It is not necessary that the spacing ring 6 is arranged on the outside of the mounting sleeve. The opposite condition can also be at hand, whereby the driving up is brought about by means of the outer of these two concentric members.

The driving up sleeve can be actuated either by mechanical or hydraulical devices.

What is claimed is:

1. A mounting tool for mounting a bearing assembly including an inner ring having a tapered inner peripheral surface and an outer ring and a plurality of rolling elements in the annular space between the rings on a shaft member with a predetermined preload or play by means of a tapered sleeve confronting the tapered surface of the inner ring operable upon axial movement relative to the inner ring to exert a radial seating force on the inner ring of the bearing assembly comprising a mounting member movable axially on the shaft member and engageable with said sleeve member to actuate it axially relative to said inner ring, a spacing ring circumscribing the mounting sleeve and actuatable axially relative thereto and positioned to engage the inner ring when said mounting sleeve is moved axially to actuate the sleeve member and a stop ring having internal threads cooperating with threads on the mounting sleeve to selectively control the position of the spacing ring on the mounting sleeve and thereby control preload in the bearing assembly.

* * * * *